(12) United States Patent
Nielsen et al.

(10) Patent No.: US 12,104,580 B2
(45) Date of Patent: Oct. 1, 2024

(54) MAIN BEARING HOUSING OF A WIND TURBINE

(71) Applicant: Vestas Wind Systems A/S, Aarhus N (DK)

(72) Inventors: Thomas Korsgaard Nielsen, Vejle (DK); Jan Hove Pedersen, Risskov (DK)

(73) Assignee: Vestas Wind Systems A/S, Aarhus N. (DK)

( * ) Notice: Subject to any disclaimer, the term of this patent is extended or adjusted under 35 U.S.C. 154(b) by 178 days.

(21) Appl. No.: 17/788,061

(22) PCT Filed: Dec. 11, 2020

(86) PCT No.: PCT/DK2020/050355
§ 371 (c)(1),
(2) Date: Jun. 22, 2022

(87) PCT Pub. No.: WO2021/139860
PCT Pub. Date: Jul. 15, 2021

(65) Prior Publication Data
US 2023/0046366 A1     Feb. 16, 2023

(30) Foreign Application Priority Data

Jan. 8, 2020   (DK) .......................... PA 2020 70015

(51) Int. Cl.
*F03D 80/70*     (2016.01)
*F16C 33/66*     (2006.01)
*F16N 31/00*     (2006.01)

(52) U.S. Cl.
CPC .......... *F03D 80/70* (2016.05); *F16C 33/6666* (2013.01); *F16C 33/6685* (2013.01);
(Continued)

(58) Field of Classification Search
CPC .. F03D 80/70; F16C 33/6666; F16C 33/6685; F16N 31/00; F16N 2210/025; F16N 2210/14; F05B 2260/98
(Continued)

(56) References Cited

U.S. PATENT DOCUMENTS 2,160,418 A      5/1939  Horger
8,302,577 B2 *  11/2012  Wunsch ............. F01M 11/0004
                                                                    123/196 R
(Continued)

FOREIGN PATENT DOCUMENTS

CN           2384025 Y       6/2000
CN         102537628 A       7/2012
(Continued)

OTHER PUBLICATIONS

Danish Patent and Trademark Office, Search and Examination Report in PA 2020 70015, Jul. 8, 2020.
(Continued)

*Primary Examiner* — Henry Y Liu
*Assistant Examiner* — Mark K Buse
(74) *Attorney, Agent, or Firm* — Wood Herron & Evans LLP (57) ABSTRACT

A main bearing housing for a wind turbine comprising a bearing arrangement having a sump located in a floor region of the main bearing housing. The sump comprises a floor pan surrounded by a side wall and includes an overflow arrangement configured to permit fluid to spill from the sump. The overflow arrangement comprises a spill passage configured with a spill inlet at or near the floor pan of the sump and a spill outlet located in a position between the spill inlet and an upper edge of the sump side wall. An advantage of the invention is that since the spill passage is fed with oil from a position that is close to the bottom of the sump, debris and
(Continued)

sediment at the bottom of the sump tends to be entrained with the flow of oil and so tends not to collect at the bottom of the sump. The lubrication system therefore is able to clean the oil more effectively because the debris and sediment is encouraged to circulate around the lubrication system.

17 Claims, 7 Drawing Sheets

(52) U.S. Cl.
CPC .......... *F16N 31/00* (2013.01); *F05B 2260/98* (2013.01); *F16N 2210/025* (2013.01); *F16N 2210/14* (2013.01)

(58) Field of Classification Search
USPC ........................................................ 184/6.12
See application file for complete search history.

(56) References Cited

U.S. PATENT DOCUMENTS

| | | | | |
|---|---|---|---|---|
| 2009/0145695 A1* | 6/2009 | Hiramatsu | ......... | F01M 11/0004 184/106 |
| 2011/0147128 A1* | 6/2011 | Schrade | ............. | F01M 11/0004 264/40.3 |
| 2020/0109646 A1* | 4/2020 | Black | .................. | F16C 33/6685 |
| 2020/0325938 A1* | 10/2020 | Yamamoto | ........... | F16J 15/3272 |
| 2021/0102528 A1* | 4/2021 | Christoffersen | ........ | F16N 7/363 |

FOREIGN PATENT DOCUMENTS

| | | |
|---|---|---|
| DE | 102015008301 A1 | 12/2016 |
| EP | 2246562 A2 | 11/2010 |
| EP | 2754893 A1 | 7/2014 |
| EP | 2863076 A1 | 4/2015 |
| EP | 2949986 A1 | 12/2015 |
| EP | 3040553 A1 | 7/2016 |
| EP | 3388668 A1 | 10/2018 |
| KR | 20110139957 A | 12/2011 |
| WO | 2014019587 A1 | 2/2014 |
| WO | 2019196994 A1 | 10/2019 |

OTHER PUBLICATIONS

European Patent Office, International Search Report and Written Opinioni in PCT Application No. PCT/DK2020/050355, Mar. 1, 2021.

* cited by examiner

MAIN BEARING HOUSING OF A WIND TURBINE

FIELD OF THE INVENTION

The invention relates to a main bearing housing of a wind turbine, and particularly to lubrication aspects of that housing.

BACKGROUND OF THE INVENTION

In order to capitalise on economies of scale, there has been a general trend for wind turbines to be designed with ever larger rotor disc diameters in an effort to increase the energy capture potential, thereby lowering the average cost of energy production. This principle has contributed to year-on-year increases in global installed capacity in an effort to re-balance the energy generation mix away from non-renewables such as oil and gas, towards renewables such as wind and solar.

However, the upward trend of wind turbine size comes with its challenges since the wind turbine towers must be taller, the blades must be longer and stronger, and the nacelles must be larger and heavier. The centrepiece of the wind turbine can be considered to be the main rotor shaft, since it carries the hub and rotor blades and harnesses the rotational energy generated by the blades so that it can be converted to electrical energy by the generator. The main rotor shaft and, thus, the bearing arrangement with which it is supported, therefore must be incredibly robust to withstand the huge forces generated during energy production.

In one known arrangement, the main rotor shaft extends through a bearing arrangement including a forward bearing that supports the end of the shaft near to the hub, that is the 'front' or 'forward' end, and a rear bearing support the end of the shaft distal from the hub, that is the 'back' or 'rear' end. The bearings function to ensure that the main rotor shaft can rotate smoothly and also transfer axial loads and bending moments to a bed-plate or base-frame. This arrangement is generally effective at decoupling the gearbox of the wind turbine from the axial and bending forces of the main rotor shaft, so that only torque is transferred to the gearbox. In order to ensure effective lubrication of each of the front and rear bearings, in typical known arrangements the bearings are supplied with a suitable greasing arrangement.

It is against this background that the invention has been devised.

SUMMARY OF THE INVENTION

According to a first aspect, the embodiments of the invention provide a main bearing housing for a wind turbine comprising: a bearing arrangement having a sump located in a floor region of the main bearing housing. The sump comprises a floor pan surrounded by a side wall and includes an overflow arrangement configured to permit fluid to spill from the sump. The overflow arrangement comprises a spill passage configured with a spill inlet at or near the floor pan of the sump and a spill outlet located in a position that is between and spaced from each of the spill inlet and an upper edge of the sump side wall.

Expressed another way, the spill outlet is in a position that is above the spill inlet and below the upped edge of the sump side wall. The skilled person would understand that the terms 'above' and 'below' should be taken to mean when the sump is in its normal orientation in use.

An advantage of the invention is that since the spill passage is fed with oil from a position that is close to the bottom of the sump, then debris and sediment at the bottom of the sump tends to be entrained with the flow of oil and so tends not to collect at the bottom of the sump. The lubrication system therefore is able to clean the oil more effectively because the debris and sediment is encouraged to circulate around the lubrication system. This is to be contrasted with known sump designs in which oil would simply overflow over the top of the sump side wall when the sump is full.

In one embodiment, the sump is located at the bearing arrangement. Positioned in this way, oil from the bearing arrangement may simply collect in the sump. The sump and bearing arrangement may be configured and arranged such that the bearing arrangement is lubricated by fluid in the sump, in use. This is advantageous in circumstances where circumferential oil supply to the bearing arrangement fails, for example due to a failure of a lubrication pump. It is also useful as a supplemental lubrication point for bearing arrangement in addition to any oil supplied around the circumference of the bearing arrangement.

The spill passage may take various configurations. In one embodiment, the spill passage may be an integral part of the sump side wall. For example, the spill passage may be a channel or drilling defined in the material of the sump side wall. This may be a particularly convenient way of integrating such a function into the sump.

In one embodiment, the spill passage may be defined by a columnar tower structure. The tower structure may be integral to the sump side wall or may be separated from the sump side wall. As a single tower structure, the spill passage provides a single spill point from the sump, and this may encourage a faster spill flow of oil from the sump which may be more effective in entraining larger particles in the oil flow. More than one spill passage may be provided as respective tower structures.

In another embodiment, the spill passage may include a laterally elongated channel that extends between a spill wall and the sump side wall. The spill passage may therefore extend across the width of the sump. It is envisaged that such an embodiment may reduce the likelihood of particles languishing in various regions of the sump floor pan.

The sump may include a drain passage. The drain passage may be separate to or combined with the spill passage. In one embodiment, the drain passage is connected to the spill passage and extends away therefrom. The drain passage may connect to a return passage which feeds back to an oil tank of a lubrication system of which the main bearing housing forms a part.

A control valve may be provided to control the flow of fluid through the drain passage. The control valve may be operated periodically to provide a more effective clean of the sump oil content. The drain passage may also include an input from a collector basin.

Optionally, the oil sump may include one or more baffle plates which help to prevent oil in the sump from being aerated due to sloshing that may occur during movement of the wind turbine during use. At least one of the one or more baffle plates may be components that are integrally cast with the main bearing housing.

Alternatively, at least one of the one or more baffle plates may be formed as separate components to the main bearing housing but attached thereto.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

DETAILED DESCRIPTION OF EMBODIMENTS OF THE INVENTION

Figure 1:
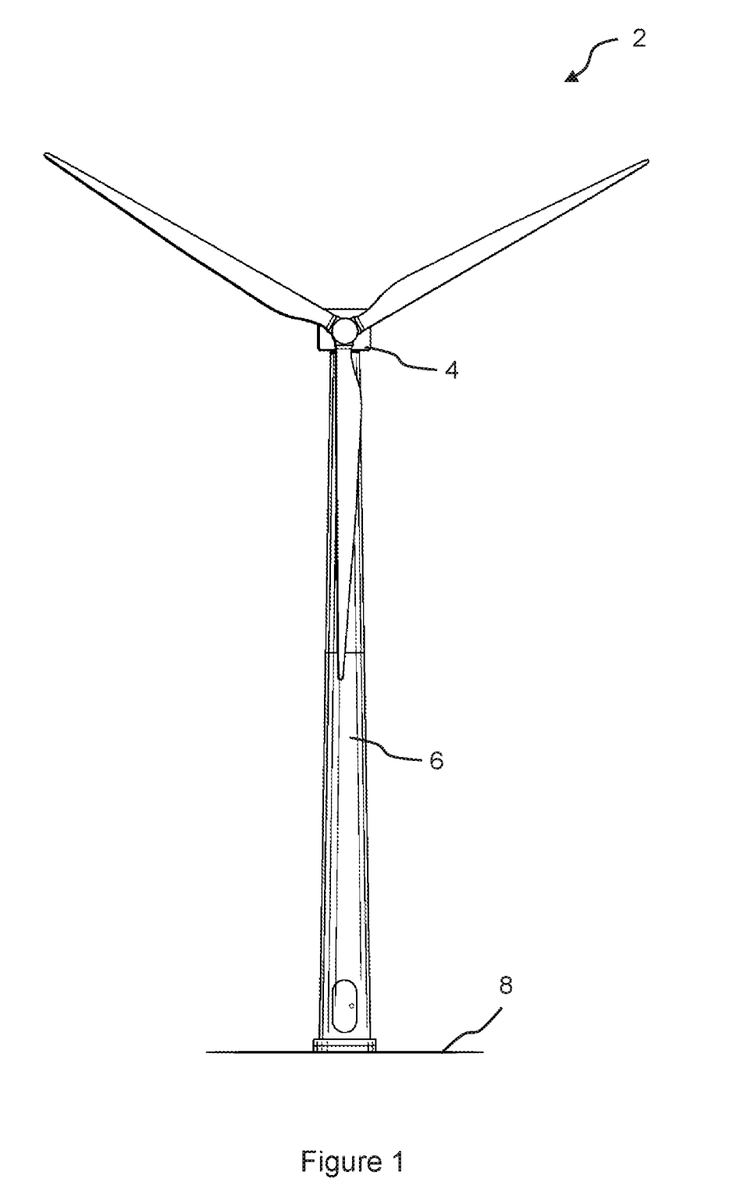
FIG. 1 is a view of a wind turbine in which embodiments of the invention may be incorporated.

With reference to FIG. 1, a wind turbine 2 includes a nacelle 4 that is supported on a generally vertical tower 6, which is itself mounted to a foundation 8. The foundation 8 may be on the land, or wholly or partially underwater. The nacelle 4 houses a number of functional components, some of which are shown schematically in FIG. 2, by way of example. Such a configuration would be well known to a skilled person.

Here, the nacelle 4 is shown as housing at least in part, the main rotor arrangement 10, a gearbox 12 and a generator 14. For brevity, some typical components have been omitted from FIG. 2 as they are not central to this discussion, for example a power converter and yaw drive. However, the presence of such components is implicit and such components would be well understood by the skilled reader.

Figure 2:
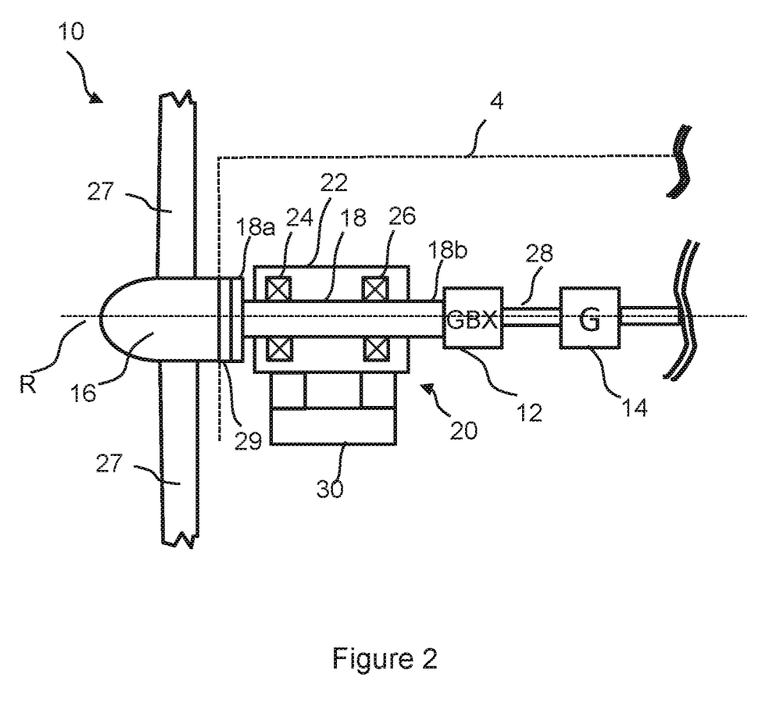
FIG. 2 is a schematic systems level view of the wind turbine of FIG. 1.

The main rotor arrangement 10 includes a hub 16 coupled to a main rotor shaft 18, which is rotatably supported by a main bearing arrangement 20 that is contained within a main bearing housing 22. In this embodiment, the main bearing arrangement 20 comprises a forward bearing arrangement 24 and a rear bearing arrangement 26. The hub 16 is connected to a plurality of rotor blades 27, although three blades are typical in a HAWT. The blades 27 are acted on by the wind and therefore torque is applied by the hub 16 to the main rotor shaft 18 which causes it to rotate within a main bearing housing 22. The front and rear bearing arrangements may be referred to as simply 'bearings' in this discussion from now on.

An input or 'forward' portion of the main rotor shaft 18 comprises a hub connection flange 18a, by which means the main rotor shaft 18 is connected to, and driven by, the hub 16. Here the flange 18a is shown as being connected to a further flange 29 that is associated with the hub 16, such that the two flanges form a coupling between the hub 16 and the main rotor shaft 18. The flange 18a can therefore be considered to be at the hub-connection end of the main rotor shaft 18.

An output portion 18b of the shaft 18 provides input drive to the gearbox 12. The gearbox 12 steps up the rotational speed of the main rotor shaft 18 via internal gears (not shown) and drives a high-speed gearbox output shaft 28. The high-speed output shaft 28 in turn drives the generator 14, which converts the rotation of the high-speed output shaft 28 into electricity. The electrical energy generated by the generator 14 may then be converted by other components (not shown here) as required before being supplied to the grid, for example, or indeed any electrical consumer.

At this point it should be noted that although in this embodiment two support bearings 24, 26 are shown that provide support to the main rotor shaft 18 at forward and rearward positions, arrangements are also known in which the rearward bearing is omitted and, instead, rear support for the main rotor shaft 18 may be provided, for instance, by the gearbox 12.

The main bearing housing 22 is supported on a base frame 30, which can also be known as a bed plate. Although not shown here, the base frame 30 may be coupled to a yaw drive at the upper part of the wind turbine tower 6 to enable the base frame 30 and, thus, the entire nacelle 4 to yaw with respect to the tower 6 so as to enable the direction of the hub 16 to be adjusted with respect to the wind direction.

The base frame 30 is typically a cast component, for example of iron/steel, and has the function to transfer the main shaft loads from the shaft 18, through the bearings 24, 26, the main bearing housing 22, and the base frame 30, and into the wind turbine tower 6.

Figure 3:
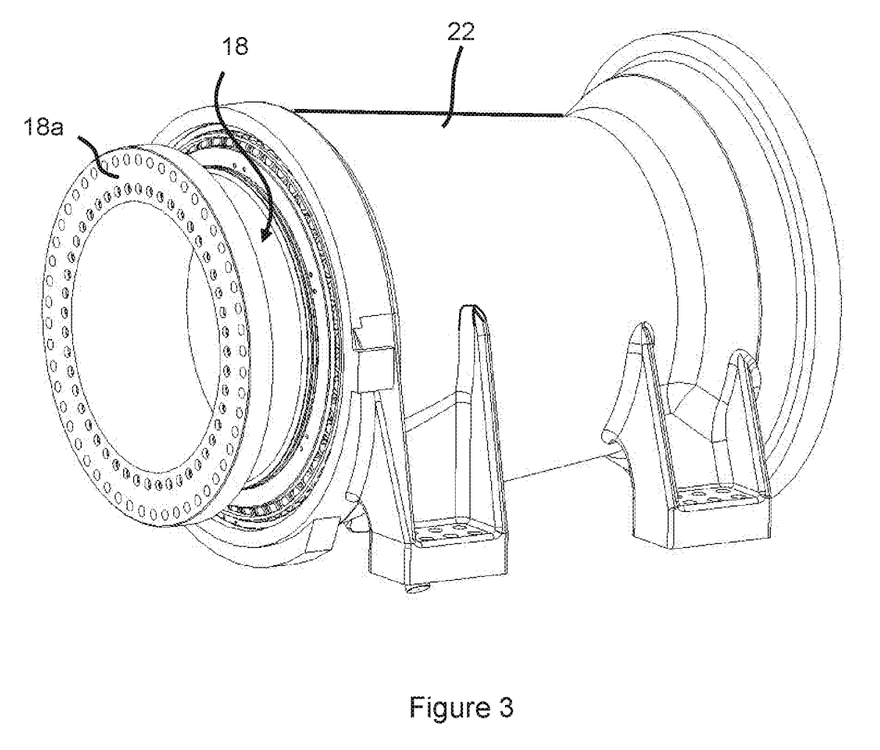
FIG. 3 is a perspective view of a main bearing housing of the wind turbine of FIGS. 1 and 2.
Figure 4:
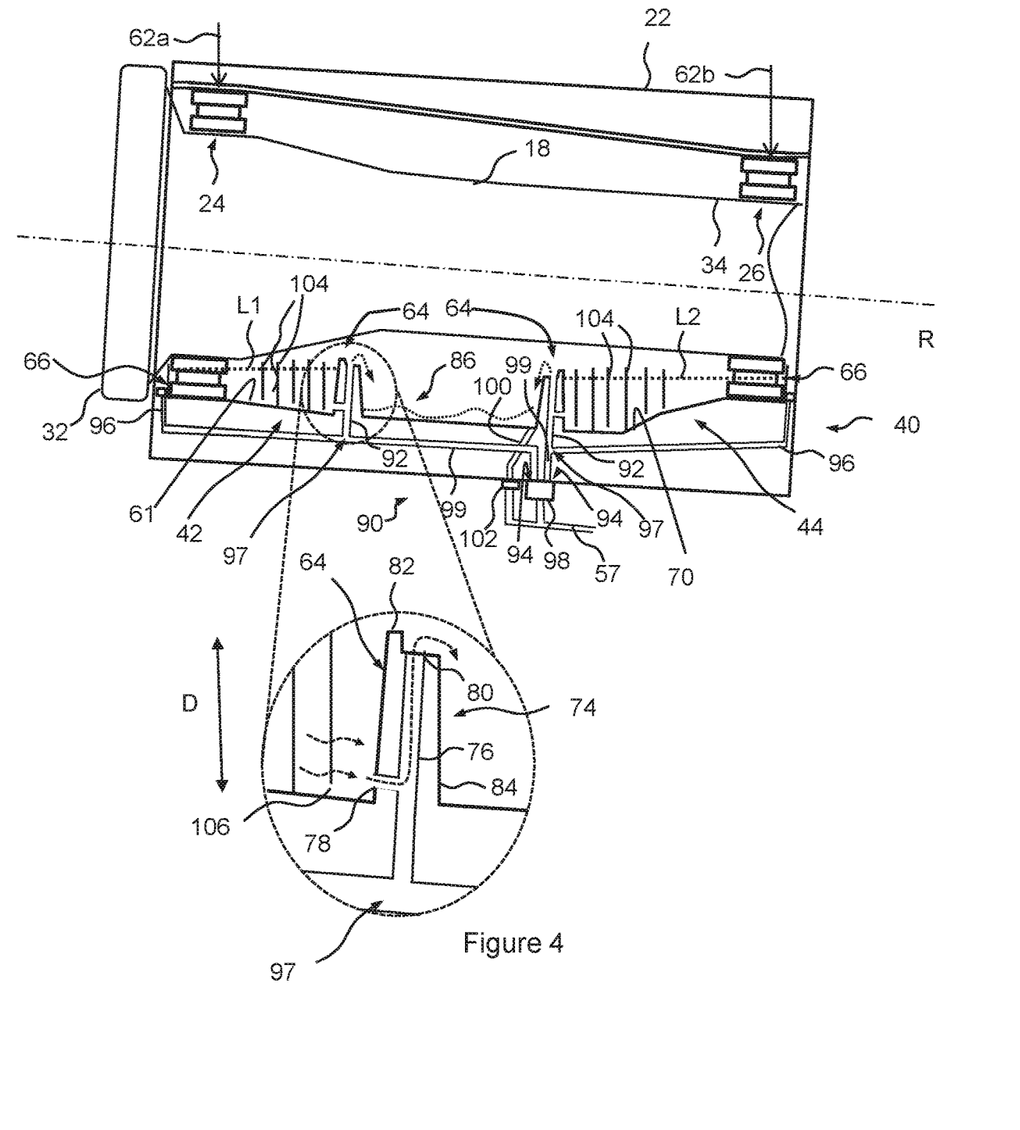
FIG. 4 is a schematic section view through the main bearing housing of FIG. 3 which illustrates embodiments of the invention.
Figure 6:
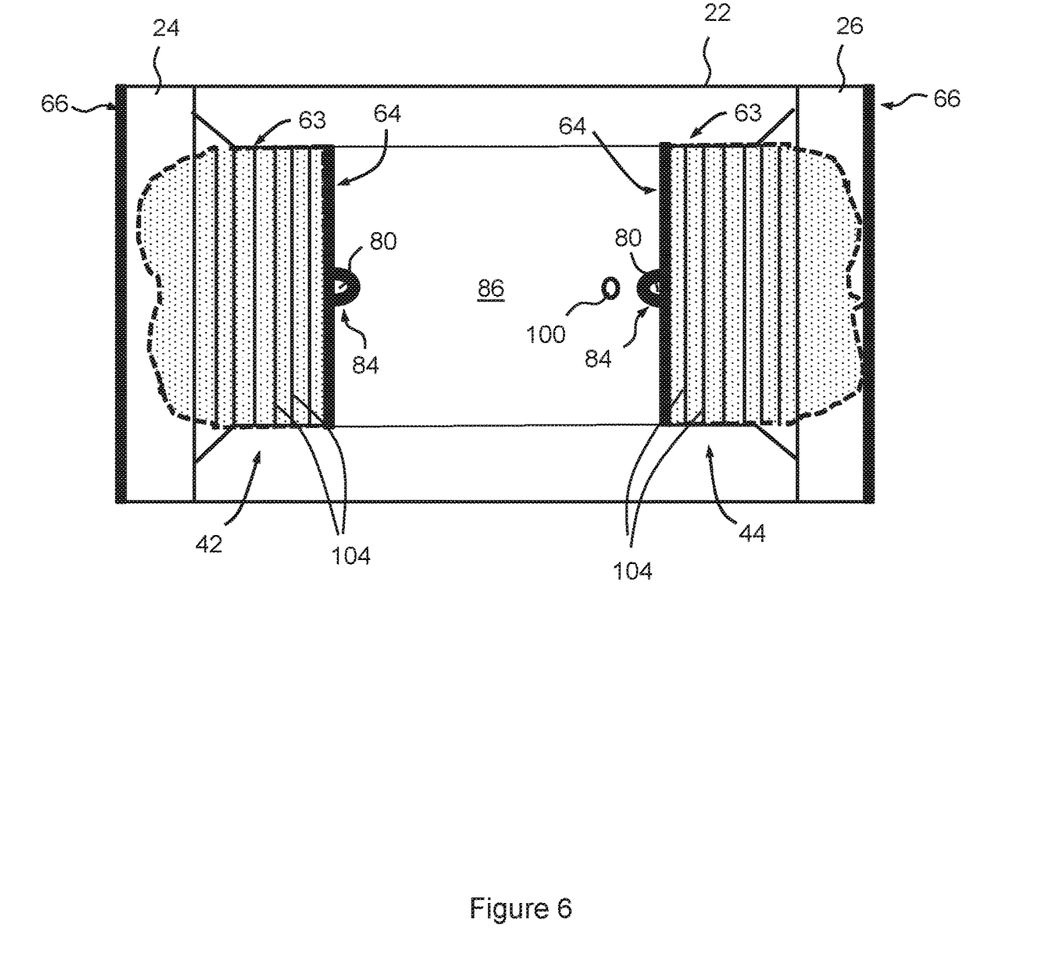
FIG. 6 is a plan view depicting the floor region of the main bearing housing of FIG. 4.

FIGS. 3, 4 and 6 illustrate a more practical realisation of a main bearing housing 22 and main rotor shaft 18 for a better understanding of the configuration of the relevant components. Note that the overall form and configuration of the main bearing housing 22 is for illustration purposes only and is not intended to limit the invention as defined by the appended claims.

Referring firstly to FIGS. 3 and 4, the main rotor shaft 18 is tapered along its length to provide a relatively larger circumference at the forward end 32 of the shaft 18 and a relatively smaller circumference at the rearward end (not shown) of the shaft 18. It should be noted that it is not essential that the main rotor shaft 18 is tapered.

The forward and rear bearings 24, 26 are situated between the main rotor shaft 18 and main bearing housing 22, at forward and rearward positions respectively along the length of the shaft 18. The forward and rear bearings 24, 26 are therefore clamped or sandwiched between the shaft 18 and the main bearing housing 22, and enable the shaft 18 to freely rotate with respect to the main bearing housing 22 during wind turbine operation, about a rotor axis R that extends through the centre of the main rotor shaft 18.

The exact form and configuration of the front and rear bearings 24,26 is not material to the invention. It should be noted that as illustrated in schematic form the bearings are shown as plain roller bearings for convenience. However, in an application such as this, the bearings would likely be configured as conical roller bearings and/or as tapered roller bearings in order more effectively to deal with axial thrust forces on the shaft 18.

Remaining with FIG. 4, it will be appreciated that the main bearing housing 22 includes a floor region 40 that extends between the front and rear ends of the main bearing housing 22 and includes various functional features, structures and formations that are involved in the lubrication of the front and rear bearings 24,26. More specifically, a first oil sump 42 is positioned at the front bearing 24, and a second oil sump 44 is positioned at the rear bearing 26. The two sumps 42,44 are positioned and configured so that lubrication oil that is injected, delivered, or otherwise provided at the front and rear bearing arrangements 24,26 is deposited in the respective oil sumps under the influence of gravity so that the oil in the sumps can lubricate the bottom ends of the bearings.

In contrast with known lubrication approaches for main shaft bearings, it will be appreciated that in the illustrated embodiment the main bearing housing 22 forms part of a fluid-based lubrication system 50, rather than a greased based approach that is typical in the art. The lubrication system 50 is shown schematically in FIG. 5 to provide further context for the invention.

Figure 5:
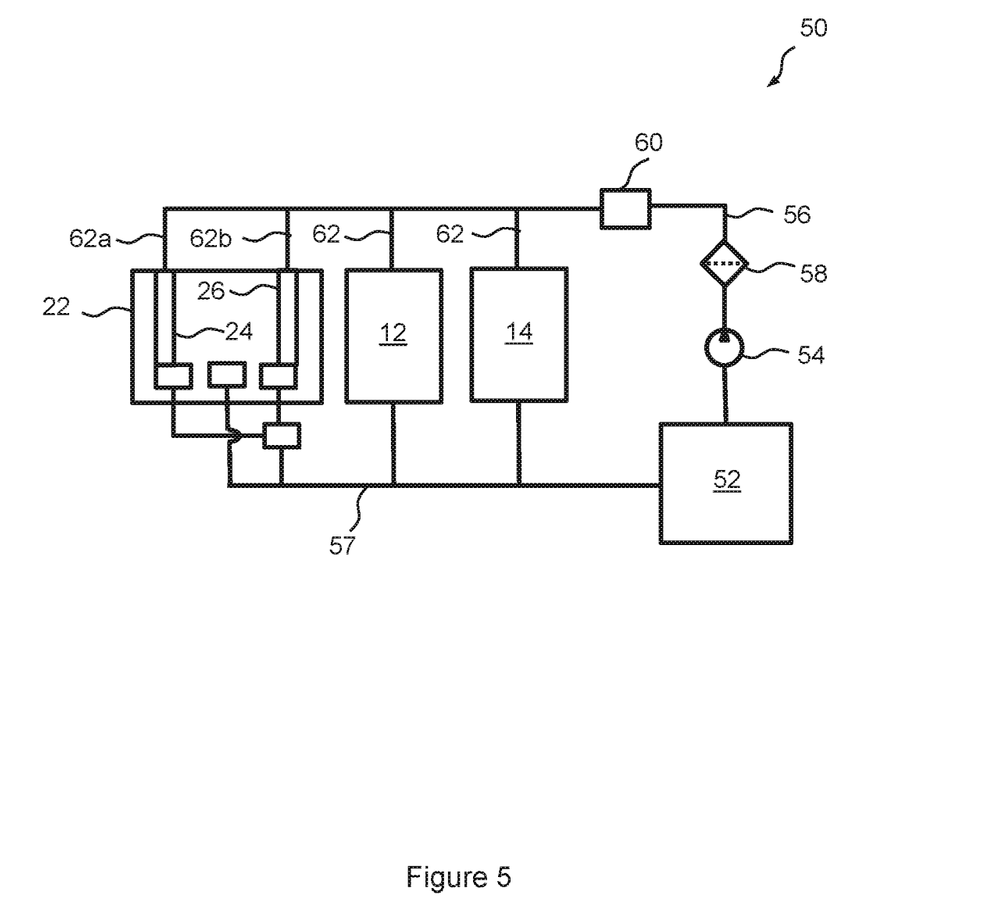
FIG. 5 is a schematic view of a lubrication system that supplies lubrication fluid to the main bearing housing of FIG. 4.

As can be seen the lubrication system 50 includes a series of lubricated sub-systems that are supplied with lubricating fluid from a tank 52. Although various types of lubricating fluid could be used, the generic term 'oil' will be used from now on for simplicity as referring to a lubricating fluid in liquid form that is capable of being used for circulating lubrication, i.e. being stored in a suitable reservoir or tank and from there being repeatedly pumped around a system to various consumer units.

The lubricating fluid is drawn from the tank 52 by a pump 54 and directed along a suitable fluid supply network 56 to the lubricant consuming sub-systems, which in overview are the main bearing housing 22, the gearbox 12 and the generator 14. A fluid return network 57 returns fluid from each of the main bearing housing 22, gearbox 12 and generator 14 to the tank 52 where it can be recirculated again to the fluid supply network 56 by the pump 54.

Shown here also in the fluid supply network 56 is a filter unit 58 and an oil heater 60 as these are usual components in an oil-based lubrication system that may be used in a variety of environmental conditions. It should be noted at this point that the lubrication system 50 is shown in FIG. 5 in a simplified form and therefore omits various common components such as check valves, tapping points, pressure gauges and so on for the purpose of clarity.

The fluid supply network 56 includes feed lines 62 that supply lubricating oil to the main bearing housing 22, the gearbox 12 and the generator 14. Two of the feed lines, here labelled 62a and 62b, provide lubricating oil to the main bearing housing 22.

More specifically, the first feed line 62a provides lubricating fluid to the front bearing 24 and the second feed line 62b provides lubricating fluid to the rear bearing 26. Although not shown here, it will be appreciated that the two feed lines 62a and 62b may supply lubricating oil to one or more delivery nozzles that may be suitably spaced about the bearing arrangements for optimal oil delivery. The feed lines 62a and 62b are also shown on FIG. 4 as directed to the top end of each of the bearing arrangements 24, 26.

Oil that has been injected through the nozzles to the front and rear bearing arrangement 24,26, is thus used for lubrication and subsequently flows into the respective oil sumps 42,44 and, from there, into the fluid return network 57. Further details of the oil sumps will be described in more detail in the discussion that follows.

At this point, it will be appreciated that a significant benefit associated with the above arrangement is that the main bearing housing 22 is included in the fluid lubrication system 50 with the gearbox 12 and the generator 14. This would not be the case in known systems in which typically the gearbox 12 and, optionally, the generator 14 are lubricated with lubricating oil by a pumped system whereas the main bearing housing 22 is typically lubricated with a different medium, usually grease. This therefore represents a simplification to the known approach to lubricating powertrain components of a wind turbine.

The discussion will now focus on the more specific features of the main bearing housing 22 that function to provide optimal lubrication to the front and rear bearing arrangements 24,26.

Referring again to FIG. 4, it has been described above that the floor region 40 of the main bearing housing 22 includes the first oil sump 42 that is located at the first bearing arrangement 24 and the second oil sump 44 that is located at the rear bearing arrangement 26. Each of the oil sumps 42,44 is configured and arranged so that it provides a reservoir for lubricating oil at a depth so that that the bottom of the bearing arrangements 24,26 are at least partly bathed or immersed in lubricating oil. This is illustrated in FIG. 4 in which the oil level (L1 and L2, respectively) in each of the first oil sump 42 and the second oil sump 44 is indicated as being in line with the roller elements in the bearings 24,26. It is also illustrated in the plan view of FIG. 6 in which it can be seen that the oil level in the two sumps floods over to the respective bearings. In this discussion the two oil sumps will be referred to collectively for simplicity where they have features in common. Likewise the features common to both oil sumps will use the same reference numerals.

Each oil sump 42,44 can be considered to comprise a floor pan 61 that is surrounded by a side wall 63. The precise configuration of the side wall may vary depending on the shape and configuration of the floor region 40 of the main bearing housing 22. For example, if the floor region 40 has substantial curvature because of the cylindrical shape of the main bearing housing 22, the oil sump may be a feature that is casted into the floor region 40 of the main bearing housing 22 so that the side wall is defined in part by the inner surface of the main bearing housing 22 itself. Another possibility is that the floor region 40 is relatively flat, and so the oil sump 42,44 may be a separate component that is placed on and secured to the floor region 40. In such a situation, therefore, the oil sump 42,44 could be a box shaped component having a floor pan 61 or base which is surrounded by one or more wall sections that together define a boundary wall of the oil sump to contain lubricating oil therein.

It should be noted that in the illustrated embodiment of FIGS. 4 and 6, the oil sumps 42,44 are defined partly by the laterally curving surface of the floor region 40 and partly by end walls. Therefore, the side wall 63 of each oil sumps 42,44 is defined in part by an axially inner end wall section 64 and an axially outer end wall section 66. Whereas the axially inner end wall section 64 is located towards the centre of the floor region 40 of the main bearing housing 22, the outer end wall section 66 is located behind the respective bearing arrangement 24,26.

As shown in FIG. 4, during normal operation the level of oil in the oils sumps 42,44 reaches a depth during operation such that a part of the respective bearing arrangements are bathed in oil. However, in order for the lubricating oil to be recirculated around the lubricating system, the main bearing housing 22 includes an overflow arrangement 74. As will be discussed in more detail, the overflow arrangement 74 comprises a spill passage 76 that is configured with a spill inlet 78 at or near the floor pan 70 of the sump 42,44 and a spill outlet 80 located in a position between the spill inlet 78 and an upper edge 82 of the inner side wall section. The spill outlet 80 is therefore above the spill inlet 78, with reference to the normal orientation of the main bearing housing 22, but below the general level of the upper extent of the side wall section 82. The normal orientation can also be considered relative to a depth direction of the sump, as shown by the reference D' shown in FIG. 4. Here, the dimension D' is denoted by a vertical arrow that is aligned with the direction of gravity, i.e. acting downwards toward the centre of the earth. Thus, the spill outlet 80 is located above the spill inlet 78 when considered in the depth direction, and also the spill outlet 80 is located below the sump side wall section 82 when considered in this same frame of reference. References to the spill outlet 80 being 'between' and spaced apart from the sump side wall 82 and the spill inlet 78 should also be taken to be along the same reference direction. It is envisaged that a relatively small spacing between the spill outlet 80 and the sump side wall section 82 will be sufficient because the sump 42,44 will spill from the spill outlet 80 before the sump overflows the side walls. A 1 cm height differential is thought to be acceptable, but a higher flow rate may be achieved by a greater height differential; for example a height differential between 5 cm and 10 cm. It should be noted that it is possible for the sump 42,44 to be mounted, in use, so that it is inclined relative to a horizontal datum. In such a circumstance, even if the spill outlet 80 and the sump side wall section 82 are at the same level when considered with reference to the sump itself, the inclination of the sump means that the spill outlet 80 and the sump side wall section 82 will actually be at different vertical heights when considered in the direction of gravity. When the sump is inclined in this way, the surface of the oil in the sump will be a true horizontal and so will flow out of the spill outlet 80 first before it overflows the sump side wall section 82.

An advantage of this configuration is that lubricating oil is allowed to spill from the bottom of the oil sump 42,44 where debris and particles such as small metal fragments typically collect. The flow of oil from the sump 42,44 into the spill passage 76 through the spill inlet 78 therefore tends to entrain debris therein and so acts as a cleaning mechanism for the sump 42,44.

Figure 7:
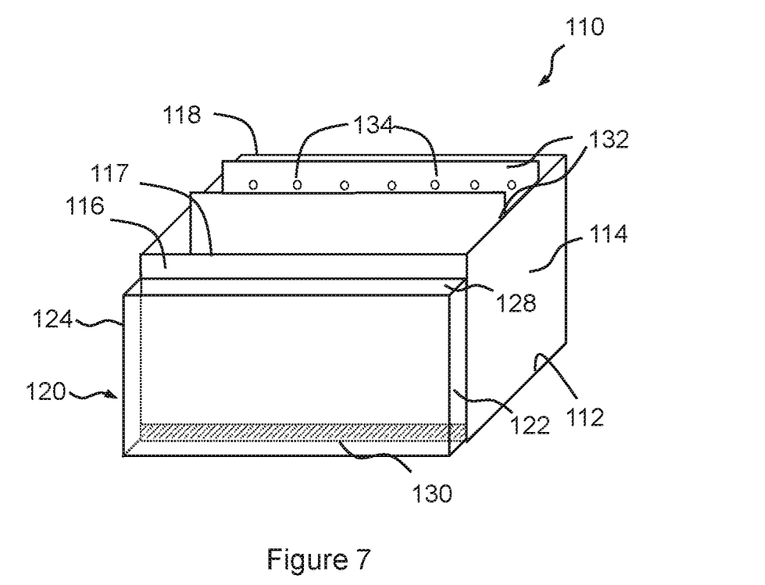
FIGS. 7 and 8 are perspective and side views, respectively, of an alternative embodiment of oil sump.
Figure 8:
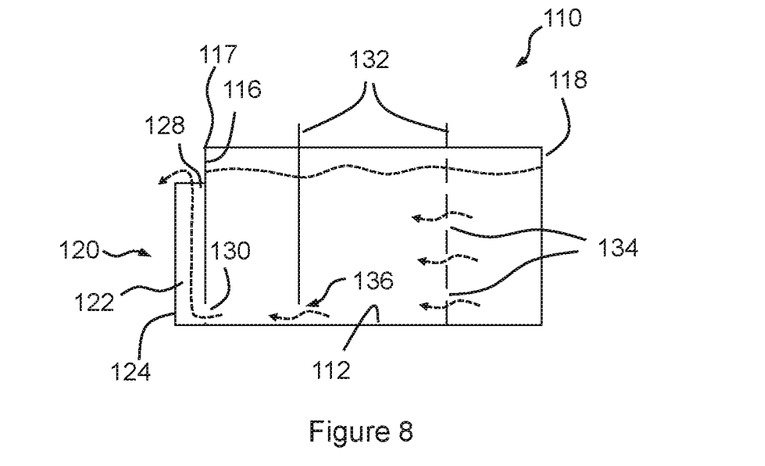

The overflow arrangement 74 may be configured in different ways. One embodiment is illustrated in FIGS. 4 and 6, whilst an alternative scheme is depicted in FIGS. 7 and 8.

Remaining with the embodiment of FIGS. 4 and 6, it should be noted that in this illustrated embodiment the inner side wall section 64 is a casted component in common with the main bearing housing 22 and that the spill passage 76 is an integral part of the inner side wall section 64. More particularly it can be seen from FIG. 6 that the spill passage is defined by a tower structure 84 that extends upwardly from the floor region 40 of the main bearing housing 22.

In this embodiment, the tower structure 84 is located in approximately a mid-position along the lateral extent of the inner side wall section 64, which can clearly be seen in FIG. 6. This is an elegantly simple solution, but it will be appreciated that other configurations are possible. For example, the tower structure 84 may be positioned more to the left-hand or right-hand side of the inner side wall section 64. Another option is that there may be provided with more than one tower structure with associated spill passages. Another option is that a single tower structure with associated spill passage may be fed by more than one spill inlet.

As can be seen by the inset panel in FIG. 4, lubricating oil from the bottom or floor pan 70 of the sump 42,44 flows into the spill inlet 78 and up through the spill passage 76 due to the pressure of lubricating oil above it in the sump 42,44. As the sump 42,44 fills with lubricating oil, following injection into the bearing arrangements by the nozzles, the level of oil in the spill passage 76 increases until such a point that the oil passes out through the spill outlet 80. As the spill outlet 80 is in a lower position than the inner side wall section 64, the oil in the spill passage 76 exits the spill outlet 80 and leaves the sump 42,44.

The oil spills out of the sump 42,44 into a collector basin 86 that is located between the two sumps. In this embodiment the collector basin 86 is a part of the floor region 40 of the main bearing housing 22.

The main bearing housing 22 also comprises a drain system 90 that is configured to drain lubricating oil from the sumps 42,44 and the collector basin 86.

In the illustrated embodiment, as will be described, the drain system 90 comprises a network of fluid passages that are integral to the structure of the main bearing housing 22 in the sense that they are part of the casting. This is a particularly convenient way to form the drain system 90 as it reduces the number of hose connections required to connect the main bearing housing 22 into the lubricating system 50. However, one or more of the passages may also be embodied as pipes or hoses that are external to the main bearing housing 22.

The functionality of the drain system 90 is to provide a permanently open drain for the collector basin 86 but to provide a selective drain function for each of the two sumps 42,44. In this way, therefore, the content of the sumps 42,44 may be purged occasionally to enable the lubricating oil within the sumps to be recirculated back the tank 52 and the filter 58.

To this end, each of the two sumps 42,44 includes primary drain passage 92 that links the respective sump to the drain system 90. In the illustrated embodiment, the primary drain passage 92 is an extension of the spill passage 76, and so is fed from the spill inlet 78. As can be seen, the primary drain passage 92 extends downwardly from the spill passage 76 and terminates at a respective drain outlet 94 defined in the underside of the main bearing housing 22.

In addition to the primary drain passage 94, each sump 42,44 is also provided with a secondary drain passage 96. The secondary drain passages 96 are configured to collect oil that has overflowed from the axially outer end wall section 66 of each sump 42,44 and feed back that overflow to the primary drain passage 92. Therefore, each of the secondary drain passages 96 are connected to the respective spill outlets 94. In the illustrated embodiment, it will be noted that the secondary drain passages 96 are connected to the respective drain outlets 94 via a connection or junction 97 to the primary drain passage 92. A further passage 99 extends from the connection 97 to the drain outlet 94.

Both of the drain outlets 94 are connected to a control valve 98. The control valve 98 is configured to selectably close or open either one of, or both of, the drain outlets 94. The outlet of the control valve 98 discharges into the fluid return network 57. Therefore, the control valve 98 controls the flow of lubricating oil from each of the sumps 42,44 through the respective drain outlets and into the fluid return network 57.

It should be noted that in the illustrated embodiment, the collector basin 86 also includes a respective drain passage 100. Here, the collector drain passage 100 is embodied as an integral passage or drilling in the main bearing housing 22 that extends downwardly from the collector basin 86 to terminate at a connector 102. The connector 102 provides an interface to the fluid return system 57. Therefore, the oil drain route from the collector basin 86 is not controlled by a valve in this embodiment. Optionally, the collector drain passage 100 could be valve-controlled.

In this embodiment, the control valve 98 is a single three-way valve. Although it is envisaged that the same functionality could be achieved by separate two-way valves, a single valve is particularly beneficial since such a valve tends to be much more compact than the equivalent use of two valves. Also, a single three-way valve only has a single fluid control mechanism, a single fluid connection with the main bearing housing, and a single electronic connection for control input purposes. Therefore, a single three-way valve is much more cost effective than the use of individual valves to control the flow from each drain passage. It is envisaged that in a normal mode of operation, the control valve 98 would close communication between the sumps 42,44 and the fluid return network 57 so that the sumps 42,44 would fill with oil up to a predetermined depth. Then on a periodic basis, the control valve 98 would be operated to drain the oil from each of the sumps 42,44. Sump drainage could be carried out on one sump at a time or both sumps simultaneously. It is envisaged that control over the control valve 98 would be achieved by the same computer control system that controls the other components of the lubrication system. This could be a separate control system to a main control system for the other wind turbine sub-systems, or the functionality could be integrated into that main control system.

As a further optional enhancement, the sumps 42,44 may include baffle plates 104. As shown in the illustrated embodiment, the baffle plates 104 are located in each sump 42,44 and extend vertically from the floor pan 70 so as to divide the volume of the sumps into compartments. In this way, the baffle plates 104 function to reduce the sloshing of oil in the sumps as the wind turbine sways during operation.

Upper edges of the baffle plates 104 may extend to a point about the intended maximum oil levels L1,L2 in the sumps which may increase effectiveness.

In order to allow oil to circulate in the sumps 42,44 the baffle plates 104 may be provided with suitable apertures. These may take the form of holes or perforations in the baffle plates 104 to allow oil to pass through. Alternatively or in addition the apertures may be defined at a lower edge of the baffle plates such that a gap 106 exists between the floor pan 70 and the baffle plate 104. Oil in the sump 42,44 is therefore able to flow under the baffle plates 104, but the baffle plates are still effective at preventing oil from excessive sloshing in the sumps 42,44.

It is envisaged that the some or all of the baffle plates 104 may be integral components with the main bearing housing 22 in the sense that they are part of a single casting. Alternatively, in another embodiment the baffle plates 104 may be separate components that are affixed to the sumps 42,44 after the main bearing housing 22 has been manufactured. Optionally, the baffle plates 104 may reach edge-to-edge across the width of the sump 42,44, as is shown here, but this is not essentially and it is envisaged that in other embodiments gaps may be left between either or both lateral edges of the baffle plates 104 and the side wall of the sump 42,44.

An alternative design of sump 110 is shown in FIGS. 7 and 8, which has many similarities with the sumps 42,44 as described above and so could also be used in a main bearing housing 22. As such the sump 110 includes a floor pan 112 and an upwardly extending side wall 114. The side wall 114 in this arrangement is rectangular in form although it should be noted that this is not essential.

The side wall 114 of the sump 110 includes a first, axially inner, side wall section 116 and a second, axially outer, side wall section 118, when considered in the orientation the sump 110 would take when situated in a main bearing housing 22 as described above.

An overflow arrangement 120 is located adjacent the inner side wall section 116. It will be noted that in contrast to the tower-like structure of the overflow arrangement 74 of the previous embodiment, the overflow arrangement 120 in this embodiment includes an elongated spill passage 122 that extends laterally across the front of the sump. Therefore, the spill passage 122 is defined by a shallow box-like structure defined by the inner end wall section 116 and a further end wall or 'spill wall' 124. The height of the further end wall defines the height of a spill outlet 128, which is lower than the height of the inner end wall section 116, more particularly and upper edge 117 thereof.

A spill inlet 130 is defined at the bottom of the sump 110, between the floor pan 112 and a lower edge of the inner wall section 116. The flow of oil through the overflow arrangement 120 is therefore very similar to that of the previous embodiment in that oil flows into the spill passage 122 through the spill inlet 130 which is at a very low position in the sump 110. The oil then travels up through the spill passage 122 and out of the spill outlet 128. Note therefore that similarly to the previous illustrated embodiment, the spill outlet 128 is positioned above the spill inlet 130 but below the upper edge of the side wall. Expressed another way, the spill outlet 128 is located between the upper edge of the side wall and the spill inlet 130.

As in the previous embodiment of FIGS. 4 and 6, the sump 110 of this embodiment includes baffle plates 132. However, only two baffle plates 132 are shown here for clarity. However, as is shown in FIG. 8, one of the baffle plates 132 includes a plurality of apertures or perforations 134 to allow oil to pass through it, and the other of the baffle plates 132 includes a gap 136 defined between a lower edge 138 of the baffle plate 132*b* and the floor pan 112 of the sump 110.

It should be noted that depending on the construction of the sump, the inner end wall section 116 could in effect be defined by a baffle plate 132 having an opening towards its bottom edge, or a baffle plate which defines a lower gap at the floor pan 112 of the sump 110.

Although the oil sump of FIGS. 7 and 8 has been described in isolation, for the avoidance of doubt it is stated here that the oil sump of this illustrated embodiment could be used in a main bearing housing 22 like that in the embodiment of FIGS. 4 to 6 in substitution for the illustrated oil sump configuration described therein.

It should be noted that the discussion above describes various variants to the illustrated embodiments and modifications that could be made by the skilled person that are not considered to fall outside of the scope of the invention as defined by the appended claims. Other options are possible.

The invention claimed is:

1. A main bearing housing for a wind turbine comprising:
a bearing arrangement,
an oil sump located in a floor region of the main bearing housing,
the oil sump comprising a floor pan surrounded by a side wall, and including an overflow arrangement configured to permit oil to spill from the oil sump,
wherein the overflow arrangement comprises a spill passage configured with a spill inlet at or near the floor pan of the oil sump and a spill outlet located in a position that is between and spaced apart from, in the direction of gravity, each of the spill inlet and an upper edge of the sump side wall, wherein the oil sump includes a drain passage, and wherein the spill passage forms a fluid path between the spill inlet and the spill outlet bypassing the drain passage.

2. The main bearing housing of claim 1, wherein the spill passage is an integral part of the side wall of the oil sump.

3. The main bearing housing of claim 1, wherein the spill passage is defined by a columnar tower structure.

4. The main bearing housing of claim 1, wherein the spill passage comprises a laterally elongated channel that extends between a spill wall and the side wall.

5. The main bearing housing of claim 1, wherein the drain passage is connected to the spill passage and extends away therefrom.

6. The main bearing housing of claim 1, wherein the drain passage also includes an input from a collector basin.

7. The main bearing housing of claim 1, wherein the drain passage also includes an input from a secondary drain passage which collects overspilled oil from a second region of the sump.

8. The main bearing housing of claim 1, wherein the drain passage connects to a return passage via a drain outlet.

9. The main bearing housing of claim 8, wherein the drain outlet is defined at a surface of the main bearing housing.

10. The main bearing housing of claim 8, wherein a control valve controls the flow of oil through the drain passage to the return passage.

11. The main bearing housing of claim 10, wherein the control valve is attached directly to the main bearing housing and interfaces to the drain outlet.

12. The main bearing housing of claim 11, wherein the control valve is a three-way valve and interfaces with the drain outlet and a further drain outlet that is associated with a respective drain passage of a second oil sump.

13. The main bearing housing of claim 1, wherein the oil sump includes one or more baffle plates.

14. The main bearing housing of claim 13, wherein at least one of the one or more baffle plates are components that are integrally cast with the main bearing housing.

15. The main bearing housing of claim 13, wherein at least one of the one or more baffle plates are formed as separate components to the main bearing housing but attached thereto.

16. A wind turbine including a main shaft rotatably supported by a main bearing housing as claimed in claim 1, a gearbox coupled to the main shaft, and a lubrication system including a tank for lubrication fluid, a lubrication pump to draw lubrication fluid from the tank, and a fluid pipe network for conveying lubrication fluid from the lubrication pump to one or more lubrication points on the main bearing housing and one or more lubrication points on the gearbox.

17. A main bearing housing for a wind turbine comprising:

a bearing arrangement, an oil sump located in a floor region of the main bearing housing, the oil sump comprising a floor pan surrounded by a side wall, and including an overflow arrangement configured to permit oil to spill from the oil sump, wherein the overflow arrangement comprises a spill passage configured with a spill inlet at or near the floor pan of the oil sump and a spill outlet located in a position that is between and spaced apart from, in the direction of gravity, each of the spill inlet and an upper edge of the sump side wall, and wherein the spill outlet is configured to spill oil into a collector basin.

* * * * *